(12) United States Patent
Restivo et al.

(10) Patent No.: US 11,865,476 B2
(45) Date of Patent: Jan. 9, 2024

(54) METHODS OF SEPARATING MATERIALS BY USE OF A CENTRIFUGAL CONTACTOR

(71) Applicant: BATTELLE SAVANNAH RIVER ALLIANCE, LLC, Aiken, SC (US)

(72) Inventors: Michael L. Restivo, Aiken, SC (US); Michael R. Poirier, Evans, GA (US); Fernando F. Fondeur, North Augusta, SC (US); Samuel D. Fink, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 0 days.

(21) Appl. No.: 18/179,602

(22) Filed: Mar. 7, 2023

(65) Prior Publication Data
US 2023/0201743 A1    Jun. 29, 2023

Related U.S. Application Data

(62) Division of application No. 16/985,894, filed on Aug. 5, 2020, now Pat. No. 11,717,769.

(51) Int. Cl.
*B01D 11/04* (2006.01)
*B04B 1/02* (2006.01)
*G01H 9/00* (2006.01)

(52) U.S. Cl.
CPC ........ *B01D 11/048* (2013.01); *B01D 11/0434* (2013.01); *B01D 11/0461* (2013.01); *B01D 11/0484* (2013.01); *B04B 1/02* (2013.01); *G01H 9/004* (2013.01)

(58) Field of Classification Search
CPC ............ B01D 11/048; B01D 11/0434; B01D 11/0461; B01D 11/0484; B04B 1/02; B04B 1/00; B04B 13/00; G01H 9/004; B01F 27/2122
See application file for complete search history.

(56) References Cited

U.S. PATENT DOCUMENTS

| 4,113,173 | A | | 9/1978 | Lolachi |
| 4,135,401 | A | * | 1/1979 | LeBreton ............... G01K 1/143 374/E1.019 |
| 4,296,882 | A | | 10/1981 | Kobayashi |
| 5,024,647 | A | | 6/1991 | Jubin et al. |
| 5,948,271 | A | | 9/1999 | Wardwell et al. |
| 9,744,476 | B2 | | 8/2017 | Wardle |

(Continued)

FOREIGN PATENT DOCUMENTS

| CN | 106267426 A | | 1/2017 | |
| CN | 206228671 U | | 6/2017 | |
| CN | 111467836 B | * | 8/2021 | ............. B01D 11/04 |

(Continued)

*Primary Examiner* — Liam Royce
(74) *Attorney, Agent, or Firm* — Dority & Manning, P.A.

(57) ABSTRACT

Centrifugal contactors that can be used for mixing or separating materials are described. The contactors include a sensing system including a communications fiber within the shaft of the contactors and access ports providing access from the communications fiber to the mixing/separating zone of the contactor. The sensing system can be utilized during operation of the contactor and can provide for detailed and accurate on-line characterization of a protocol, as well as process control and system modification as necessary during operation.

10 Claims, 9 Drawing Sheets

(56) References Cited

U.S. PATENT DOCUMENTS 10,434,239 B1 10/2019 Briggs et al.

FOREIGN PATENT DOCUMENTS

| DE | 102016002949 A1 | 9/2017 |
| --- | --- | --- |
| ES | 2 345 428 A1 | 9/2010 |
| JP | H 09220493 A | 8/1997 |
| SU | 1791759 A | 1/1993 |
| WO | WO 2012/021167 A2 | 2/2012 |
| WO | WO 2018/053026 A1 | 3/2018 |

* cited by examiner

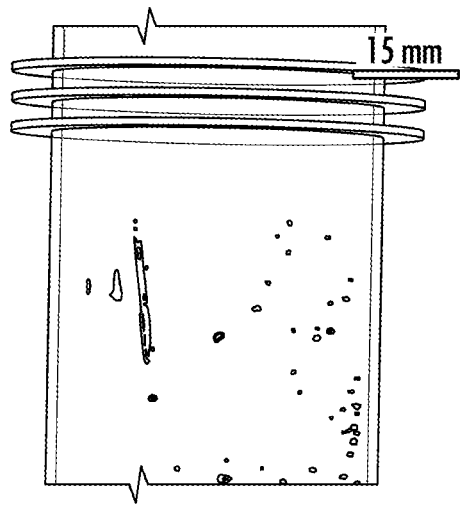
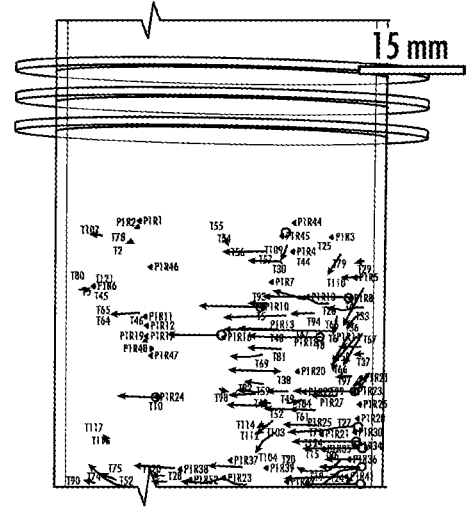
FIG. 17　　　　FIG. 18
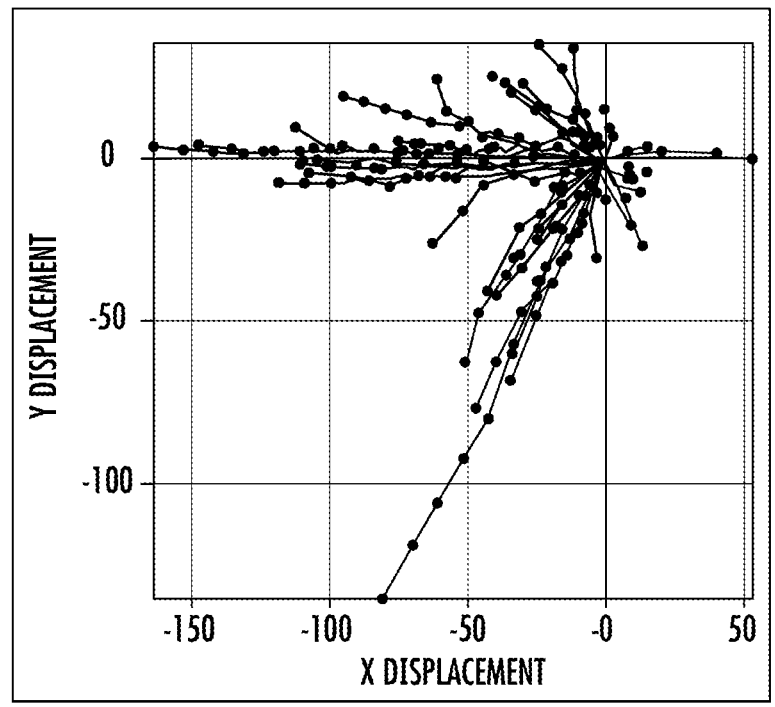
FIG. 19

METHODS OF SEPARATING MATERIALS BY USE OF A CENTRIFUGAL CONTACTOR

CROSS REFERENCE TO RELATED APPLICATION

This application is a Divisional Application claiming priority to U.S. patent application Ser. No. 16/985,894 having a filing date of Aug. 5, 2020, which is incorporated herein by reference for all purposes.

FEDERAL RESEARCH STATEMENT

This invention was made with Government support under Grant No. DE-AC09-08SR22470, awarded by the U.S. Department of Energy. The Government has certain rights in the invention.

BACKGROUND

Centrifugal contactors include centrifugal separators as well as impeller mixed tanks. Centrifugal separators impart strong centrifugal forces by high speed rotation of materials within a separating zone. The inertial centrifugal forces imparted on the contents lead to outward drive on denser materials with less dense materials remaining closer to the central axis, causing development of a density gradient across the radial span. Separations enabled by use of such centrifugal contactors can include organic/aqueous separations and separation of dissolved gases from liquids, as well as liquid-liquid extractions using immiscible liquids as extraction solvents. Liquid-liquid extraction by use of centrifugal contactors is commonly used for reactions and decontaminations, as well as more benign extractions. Use of centrifugal separators has been particularly beneficial in the nuclear industry; for instance, for separation of lanthanides and actinides and also recovery of uranium and transuranics from nuclear waste.

FIG. 1 illustrates a typical annular centrifugal separator 200. As shown, a separator 200 includes inlet ports 206, 208 through which fluids of interest 202, 204 can be introduced into the separator 200. Feed fluids 202, 204 can include materials that differ from one another by density either mixed in a single feed or in separate feeds, depending upon the application. For instance, a feed fluid 202 introduced via inlet port 206 can include only heavier phase materials or can be a mixed phase fluid and a feed fluid 204 introduced via an inlet port 208 can include only lighter phase materials or can be a mixed phase fluid. The fluid feeds 202, 204 are introduced into the annular mixing zone 210 where they are mixed and migrate downward to a floor of housing 212. Radial vanes 214 direct the mixed contents into a separating zone that is surrounded by a wall 234 and contains a rotor 216 surrounding a shaft 236. In the centrifugal contactor of FIG. 1, the rotor 216 is a hollow rotor, with the blades of the rotor 216 separated from, and configured to spin around, the shaft 236 along the length of the separating zone. During use, centrifugal forces imparted on the fluids by revolution of the rotor 216 impel the denser phase 230 of the mixture outward against the wall 234 while the less dense phase 220 is retained radially inwardly closer to the shaft 236. The less dense phase 220 flows over a weir 238 and is removed via a first outlet port 222 and the denser phase 230 flows over a weir 240 and is removed via a second outlet port 232.

Unfortunately, due to the high rotational speeds of centrifugal contactors and the construction materials necessary to resist degradation during use, as well as to provide suitable safety, particularly in nuclear applications, process monitoring and control of centrifugal contactors during operation is problematic. What is needed in the art are centrifugal contactors that can facilitate on-line process control. For instance, a centrifugal contactor that can monitor a separation or mixing process as it is occurring could identify process upsets early on and could also be used to better control processing conditions of a protocol.

SUMMARY

According to one embodiment, disclosed is a centrifugal contactor that includes a housing and a shaft within the housing. The shaft includes a cylindrical wall and a hollow core. The shaft also includes an access port within the cylindrical wall. The centrifugal contactor includes a plurality of rotor blades configured to revolve about an axis of the shaft, the axis extends along a length of the shaft and within the hollow core of the shaft. The plurality of rotor blades define a zone within the housing, for instance a separating zone or a mixing tank within the housing. The centrifugal contactor also includes a communications fiber (e.g., an optical fiber bundle) that can be located within the hollow core of the shaft. The communications fiber is configured to communicate a signal from the zone via the access port.

Also disclosed is a method for separating a first material from a second material. A method can include feeding the first and second materials to a separating zone of a centrifugal contactor and spinning the first and second materials about a shaft by use of a plurality of rotor blades that revolve about an axis of the shaft. Upon the spinning, the first and second materials separate within the separating zone according to a density gradient across a span in a radial direction, the radial direction being defined by a radius of the shaft. A method can also include, during the spinning, transmitting a signal from the separating zone to a communications fiber retained within the shaft. The signal can then be analyzed to obtain information about the separation of the first and second materials. In some embodiments, the signal can be a response to an input signal that is transmitted from the communications fiber to the separating zone.

Also disclosed is a method for mixing a first material with a second material. A method can include feeding the first and second materials to an impeller mixing tank and spinning the first and second materials about a shaft by use of a plurality of rotor blades that revolve about an axis of the shaft. Upon the spinning, the first and second materials can mix together within the mixing tank. A method can also include, during the spinning, transmitting a signal from the mixing tank to a communications fiber retained within the shaft. The signal can then be analyzed to obtain information about the mixing of the first and second materials. In some embodiments, the signal can be a response to an input signal that is transmitted from the communications fiber to the mixing tank.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 17 illustrates selected particles imaged by use of a centrifugal contactor.

FIG. 18 illustrates the tracks of the selected particles of FIG. 17 during a mixing operation.

FIG. 19 provides an orientation plot for the selected particles showing displacement during the mixing operation.

Figure 1:
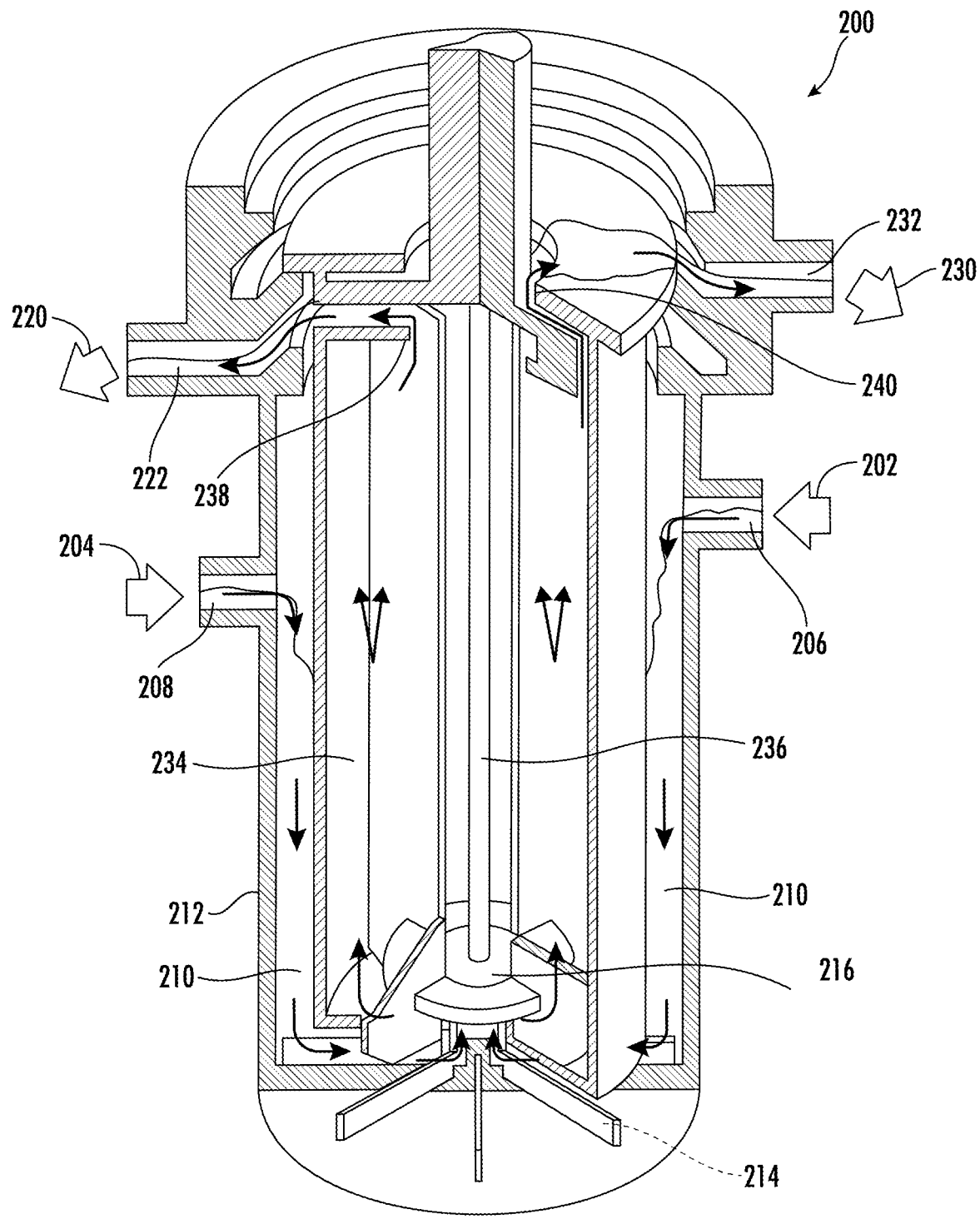
FIG. 1 illustrates a typical hollow rotor prior art centrifugal contactor.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed are centrifugal contactors that can provide researchers with the ability to discern information about activities, e.g., separations or mixings, of the contactor during operation. Moreover, in some embodiments, information regarding an activity can be obtained at different heights of the contactor. As such, the devices can provide for detailed and accurate on-line characterization of a protocol, as well as process control and system modification as necessary during operation; for instance, in the case of process upset or unforeseen process variations.

The centrifugal contactors disclosed herein can include many components in common with a typical high speed centrifugal separator, such as the prior art contactor illustrated in FIG. 1. For instance, a centrifugal contactor can include inlet and outlet ports, a mixing zone and separate separating zone, vanes, rotors, weirs, etc. as are generally known. In other embodiments, the contactors can be lower speed contactors and/or need not include all of the components of a traditional high speed centrifugal separator. For instance, in some embodiments disclosed contactors can be primarily for mixing, e.g., an impeller mixed tank that includes a mixing tank and a centralized mixing shaft, without the specialized weirs, ports, vanes, etc. of a high speed centrifugal separator.

Figures 2, 3:
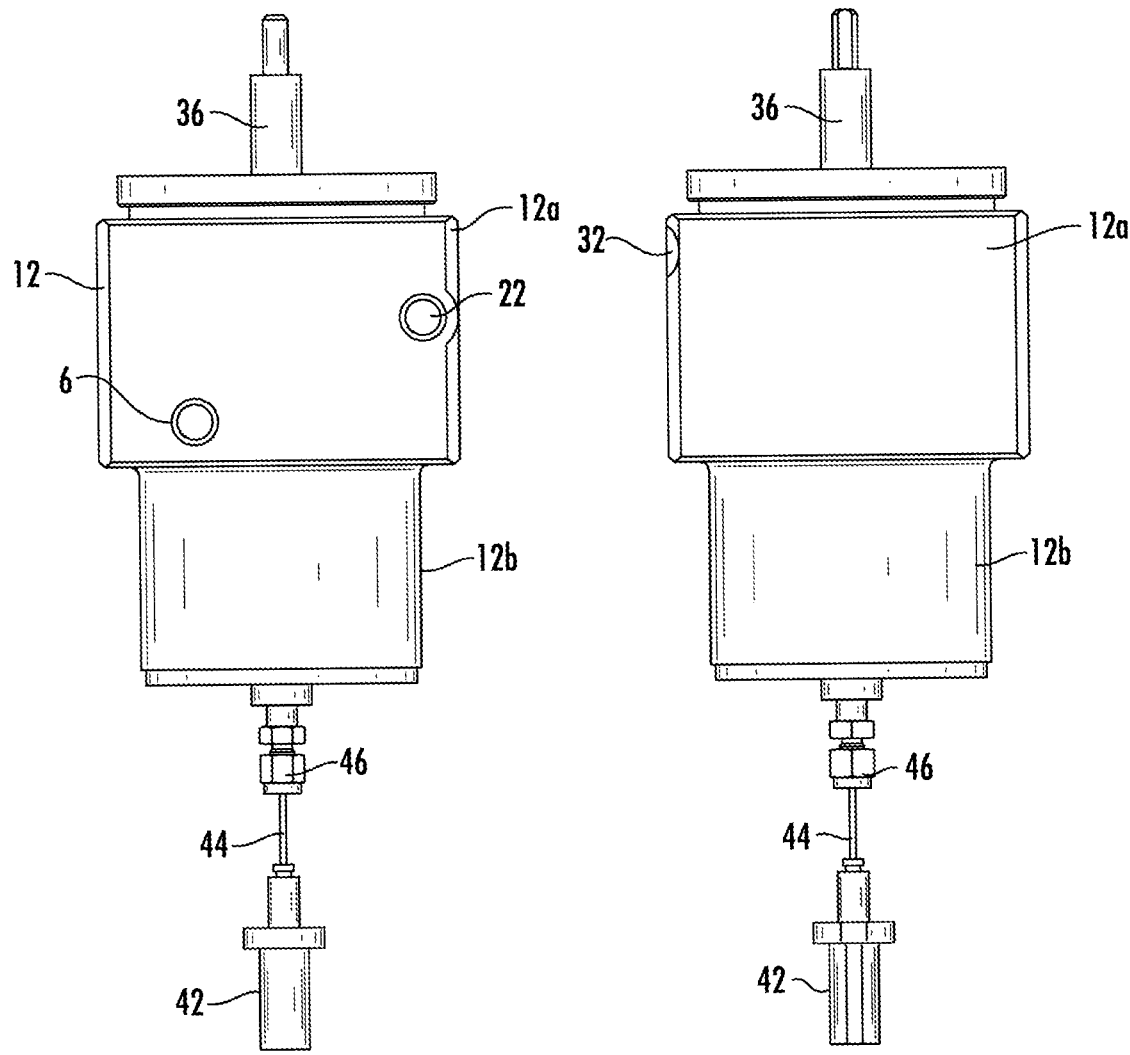
FIG. 2 provides an elevation view of one embodiment of a centrifugal contactor disclosed herein.
FIG. 3 provides a side elevation view of one embodiment of a centrifugal contactor disclosed herein.

FIG. 2 and FIG. 3 present elevation views of the front (FIG. 2) and side (FIG. 3) of one embodiment of a centrifugal contactor as disclosed. As illustrated, a centrifugal contactor can include a housing 12 that defines at least one inlet port 6 and outlet ports 22, 32, e.g., a light phase outlet port 22 and a heavy phase outlet port 32.

Whether designed for utilization as a mixer or a separator, the centrifugal contactors described herein can include a sensing system that can include a signal generator/receiver 42 and a communications fiber 44. The communications fiber 44 can communicate signals from the interior of the housing 12 to the signal generator/receiver 42 for instance via a housing access port 46. These signals can provide information with regard to activities within the housing 12. In some embodiments, the communications fiber 44 can also communicate a signal from the signal generator/receiver 42 to the interior of the housing 12, e.g., an excitation signal that can be used to generate a response signal within the housing 12.

A housing access port 46 can allow for removal and/or motion of the communications fiber 44 within the housing 12. For instance, a housing access port 46 can include a clean-in-place access port with a Swagelok fitting or the like, as is known in the art.

A housing 12 can be formed of typical materials, preferable of which can generally depend upon the desired use of the device. For instance, a housing 12 can be formed of strong, chemically resistant materials such as stainless steel that can resist the inertial forces during operation. The disclosed centrifugal contactors can be particularly beneficial in such embodiments, in which the contactor housing 12 is formed of an opaque materials, as the systems can enable examination of the interior of the housing during operation.

The housing 12 can in some embodiments take the shape of a canister with top section 12a and a bottom section 12b. The top section 12a is typically wider than the bottom section 12b because the top section 12a contains fluid inlet port(s) 6, outlet ports 22, 32, and interior fluid collection components. In some embodiments, the top section 12a and the bottom section 12b can be separable for, e.g., interior access, cleaning, repair, etc. During use, the inlets and outlets are coupled with transfer conduits (not shown) so as to deliver liquids to the centrifugal contactor and remove them from the centrifugal contactor. The particular locations of the inlet ports and outlet ports of a contactor are not particularly limited. In one embodiment, inlet and outlet ports for a light phase can be located on the same side of the device, and inlet and outlet ports for a heavy phase can be located on an opposed side. Arranging the inlet ports and outlet ports in such a fashion can facilitate connecting contactors together in series. For instance, such an arrangement can facilitate countercurrent flow of phases between multiple devices connected to one another in series; for instance, in a multistage extraction. As stated, however, there is no particular limitation on the locations of the inlet ports and outlet ports on the housing 12.

Figure 4:
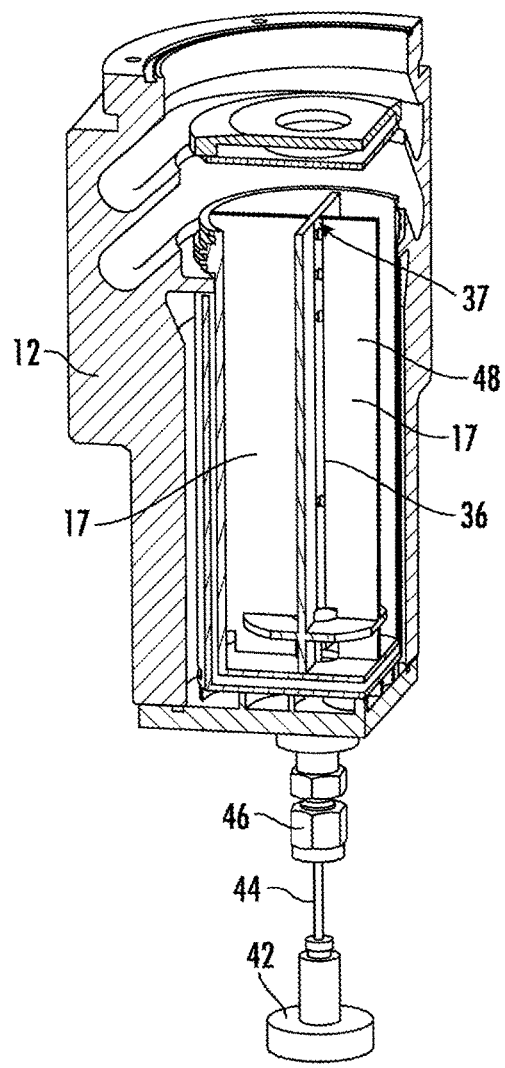
FIG. 4 provides a ¼ cut-away view of one embodiment of a centrifugal contactor disclosed herein.
Figure 5:
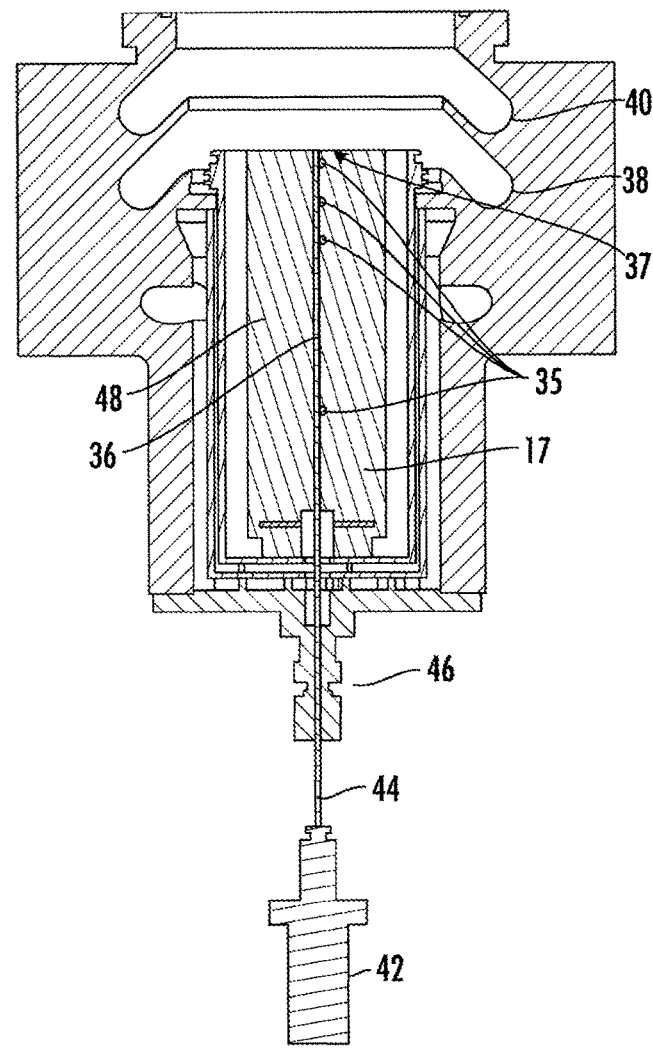
FIG. 5 provides a half section view of one embodiment of a centrifugal contactor disclosed herein.

Interior details of one embodiment of a centrifugal contactor are illustrated in FIG. 4 and FIG. 5. As illustrated, the contactor includes a centrally located shaft 36 that passes along the central axis of a zone 48. In this embodiment, the centrifugal contactor can be designed primarily for separations and the zone 48 can be in fluid communication with a light phase weir 38 and a heavy phase weir 40 for removal of product from the interior of the housing 12, as with previously known centrifugal contactors designed for separations. As stated, however, the centrifugal contactors are not limited to separators, and in other embodiments, a centrifugal contactor can be utilized for mixing components, in which case the zone 48 can be a mixing tank.

The contactor can also include a series of rotor blades 17 that are attached to the shaft 36. As such, during use of this device the shaft 36 will rotate with the attached rotor blades 17. In other embodiments, a centrifugal connector of the invention can be a hollow rotor-type centrifugal contactor, such as that of FIG. 1, in which the vanes and shaft are stationary during use while the rotor revolves around the shaft. Any arrangement of the rotor blades 17 as is generally known in the art is encompassed herein, as is the number of rotor blades 17 of a device. In particular, a contactor is not limited to four rotor blades 17 as in the illustrated embodiment.

The communications fiber 44 can pass from the signal generator/receiver 42 through the housing access port 46 and into the central hollow core of the centrally located shaft 36. The shaft 36 also includes one or more shaft access ports 35 along the length of the shaft 36 that allow access from the hollow core of the shaft 36 to the zone 48 of the contactor. Any number of shaft access ports 35 can be formed within the cylindrical wall of the shaft 36, and the shaft access ports 35 can be equally spaced along the axial length of the shaft 36 or can be irregularly spaced along the length 35. In addition, while in general all of the multiple shaft access ports will face in generally the same direction, this is not a requirement of a device, and each of the multiple shaft access ports 35 can face outward from the shaft 36 in any direction, provided a communications fiber 44 can be located so as to communicate with each of the shaft access ports 35. For instance, all shaft access ports 35 can be vertically aligned on a shaft 36 and facing in a single direction, all shaft access ports 35 can be facing different directions out from the shaft 36, or a shaft 36 can include both aligned and non-aligned shaft access ports 35.

Figures 6, 7:
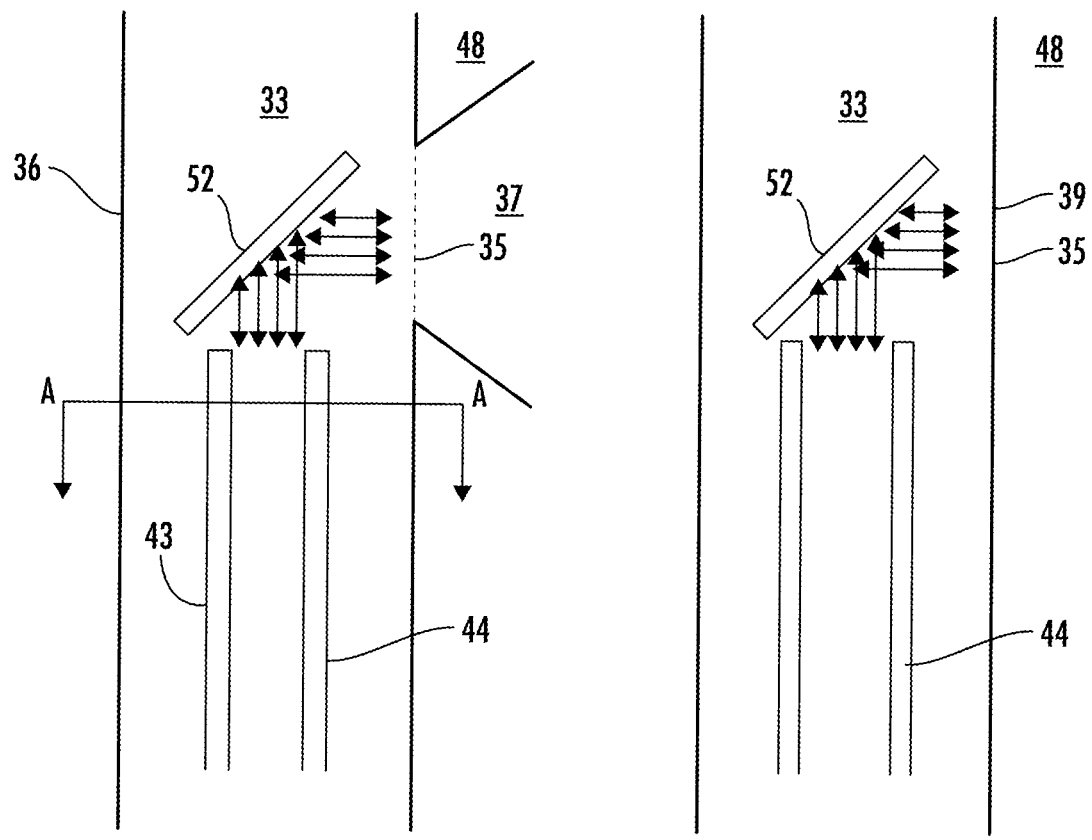
FIG. 6 illustrates a portion of a shaft and one embodiment of a sensing assembly of a centrifugal contactor disclosed herein.
FIG. 7 illustrates a portion of a shaft and another embodiment of a sensing assembly of a centrifugal contactor disclosed herein.

FIG. 6 illustrates an enlarged view of a shaft access port 35 formed in a wall of a shaft 36. A shaft access port 35 can include a material that is able to communicate signals of the sensing system between the communications fiber 44 and the zone 48 and that also prevents the contents of the zone 48 external to the shaft 36 from influx to the hollow core 33 of the shaft 36. For instance, and depending upon the nature of the signals used by the sensing system, the shaft access ports 35 (alternately referred to herein as windows or diaphragms) can be transparent to one or more electromagnetic wavelengths of energy (e.g., a window) and/or can be designed to transmit or translate acoustic signals (e.g., a diaphragm).

In one embodiment, as illustrated in FIG. 6, an access port 35 can include a window that is transparent to emission and response wavelengths of an optical sensing system. For instance, in those embodiments in which an optical sensing system is intended for use with signals in the IR or near IR spectra, an access port 35 can be transparent to at least those expected wavelengths. In one such embodiment, zinc selenide (ZnSe) can be utilized, as it is known for low absorptivity at infrared wavelengths and high transmission in the visible spectrum. Other materials known for formation of IR transparent windows and the like can alternatively be utilized including, without limitation, zinc sulfide (ZnS), germanium (Ge), and gallium arsenide (GaAs).

Of course, an optical sensing system is not limited to IR or near-IR spectra, and the term "optically transmissive" is intended to refer to the ability to transmit electromagnetic wavelengths in any suitable spectra capable of being transmitted in an optical fiber including, without limitation, X-ray, UV, visible, IR, and near IR.

In some embodiments, a centrifugal contactor can be designed to utilize acoustic signals in a sensing protocol. One such embodiment is illustrated in FIG. 7, in which a shaft access port 35 can include a diaphragm 39 that can transmit or translate an acoustic signal between a zone 48 and a communications fiber 44. By way of example, a diaphragm 39 can include mutually aligned Ronchi ruling-type grating structures placed sufficiently close to one another such that relative motion between the gratings in the grating plane (generally aligned with the axis of the shaft 36) and perpendicular to the line pattern of the grating (generally perpendicular to the axis of the shaft 36) can produce a modulation of an optical signal passing through the diaphragm 39. In such an embodiment the mutually aligned grating structures of the diaphragm 39 can be transmissive to at least one of an optical signal emitted from a communications fiber 44 and delivered to a zone 48 and a response signal from the zone 48 back to the communications fiber 44 generated in response to the emission, said signal providing for the detected signal modulation due to the acoustics within the zone 48.

In some embodiments, in conjunction with a diaphragm 39 for acoustic monitoring, a shaft access port 35 can be transmissive to both an optical emission signal and an optical response signal, either one or both of which can be transmitted through the diaphragm 39 or by use of another transmissive portion of a shaft access port 35. In such an embodiment, information obtained by the sensing system can be provided by the acoustic response of the diaphragm 39 to the contents of the zone 48 as well as by the optical response signal from the contents of the zone 48 in response to the optical emission signal from the communications fiber 44.

Other optical acoustic sensing systems as are known in the art may alternatively be utilized. For instance, a sensing system can include a cantilever or a flexible diaphragm 39 that is able to move in a direction generally perpendicular to the axis of the shaft 36 in response to an acoustic signal within the zone 48. In addition, the diaphragm 39 can be reflective to an optical signal emitted from the communications fiber 44. Upon displacement of the diaphragm 39 due to an acoustic signal in the zone 48, a change in a characteristic of the signal reflected from the diaphragm to the communications fiber 44 (e.g., intensity of the signal) can indicate the relative displacement of the diaphragm 39 with respect to the communications fiber 44, which can indicate information regarding an acoustic signal within the zone 48. In one such embodiment, a diaphragm 39 can also be partially transmissive to the emission signal, and the transmitted signal can generate an optical response signal that can be transmitted back to the communications fiber 44. For instance, a diaphragm 39 can include a partially reflective material at a surface or can be only partly covered by a reflective material. In one embodiment, a communications fiber 44 can emit two different wavelengths, one that reflects from the diaphragm to monitor acoustic signals within the zone 48, and one that transmits through the shaft access port 35 and generates a response signal that can pass back through the shaft access port 35 and be detected by the communications fiber 44. In such a fashion, a system can provide both optical and acoustic information about the contents of a zone 48.

A diaphragm 39 can be formed of any suitable material that can exhibit optically detectable modulation in response to an acoustic signal in the zone 48 (e.g., change in reflectance or change in a grating line pattern) and optionally, transmission of an emission signal. For instance, a diaphragm 39 can include a flexible thin film, e.g., a polymeric flexible thin film, at least partially coated with a reflective material such as silver or gold.

A shaft access port 35 (either a window or a diaphragm or a combination thereof) can include a material that is inert to the contents of the zone 48 and to the operating environment of a protocol. For instance, coatings may be employed on either or both faces of a shaft access port 35 to enhance chemical inertness and/or to reduce reflection at either surface of the access port 35. An access port 35 may be retained in position by mechanical seal elements with surrounding materials of a wall of shaft 36, by sealants, adhesive bonding media, soldering, or other bonding or securement technique and material as would be evident to one of skill in the art.

Figure 8:
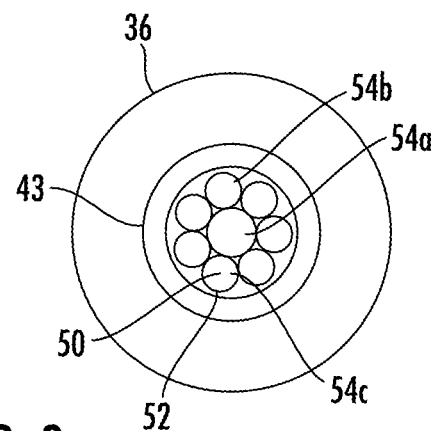
FIG. 8 illustrates a sectional view of a sensing assembly along a section line A-A as illustrated in FIG. 6.

A communications fiber 44 can be configured to carry signals from a signal generator/receiver 42 to a zone 48 and can carry signals from a zone 48 to a signal generator/receiver 42. In general, a communications fiber 44 can carry one or more optical fibers. For instance, in the embodiment of FIG. 6, a communications fiber 44 can include a bundle of optical fibers 54a, 54b, 54c, as illustrated in FIG. 8 in cross section that can be retained in a sheath 43

Each optical fiber, e.g., 54c can include a core 50, through which light may travel, and an external cladding layer 52. The difference in the index of refraction between the material of the core 50 and the material of the clad 52 defines the critical angle at which total internal reflection takes place at the core/clad interface. Thus, light that impinges upon the interface at an angle greater than the critical angle is completely reflected, allowing the light to propagate down the fiber.

Optical fibers for use as disclosed herein may generally include multi-mode fibers having a core diameter greater than about 10 micrometers (μm). The preferred core diameter in any particular embodiment may depend upon the characteristics of excitation signal and/or emission signal that are expected to travel through the fiber, among other system parameters. For instance, in those embodiments in which a laser is an excitation source, a core diameter may be between about 50 μm and about 100 μm or about 80 μm in one embodiment. In other embodiments, for instance in those embodiments in which an excitation light source produces less coherent radiation, such as a multi-wavelength light emitting diode (LED), for example, it may be preferable to utilize an optical fiber having a larger core diameter; for instance, between about 90 μm and about 400 μm.

The core/clad boundary of a fiber may be abrupt, as in a step-index fiber, or may be gradual, as in a graded-index fiber. A graded-index fiber may be preferred in some embodiments, as graded index fibers may reduce dispersion of multiple modes traveling through the fiber. This is not a requirement, however, and step-index fibers may alternatively be utilized, particularly in those embodiments in which an optical fiber is of a length such that dispersion will not be of great concern.

Optical fibers for a sensing system can be formed of any suitable material. For instance, an optical fiber formed of any suitable type of glass may be used, including, without limitation, silica glass, fluorozirconate glass, fluoroaluminate glass, any chalcogenide glass, or so forth as a component of the core and/or the clad. Polymer optical fibers (POF) are also encompassed by the present disclosure. For instance, an optical fiber formed of suitable acrylate core/clad combinations, e.g., polymethyl methacrylates, may be utilized.

As illustrated in FIG. 8, a communications fiber 44 can include a plurality of individual optical fibers 54a, 54b, 54c held as a cohesive unit with suitable sheathing that 43 that may hold the unit together as a single communications fiber 44. When incorporating multiple optical fibers 54a, 54b, 54c, etc. in a single communications fiber 44, the preferred arrangement of individual fibers is not critical and can generally vary depending upon the specific design of the sensor. For instance, when utilizing a plurality of optical fibers 54a, 54b, 54c in a communications fiber 44, individual fibers may be formed and arranged in relation to one another so as to provide a wider angle of detection. Through location of a plurality of optical fibers, e.g., 54b, 54c, designed for receiving a signal from a zone 48 in a single communications fiber 44, improved data collection may be attained, as the total field area covered by the combined receiving fibers will be larger than that for a single fiber. By way of example, in one embodiment, a communications fiber can include a single optical fiber 54a for transmitting an emission signal to a shaft access port 35 and this transmitting fiber 54a can be surrounded by multiple receiving fibers 54b, 54c, etc.

Any number of individual optical fibers or communications fibers can be incorporated in a sensing system, though arrangement of the fibers within the hollow core 33 of a shaft 36 should be such that the centrifugal contactor remains balanced during use and such that the fibers can be located so as to have communications access to the zone 48 during use. It will be appreciated in those embodiments in which a sensing system incorporates multiple optical fibers for transmitting one or more signals from a source to a zone, plural excitation energy sources may be used. In such a configuration, each excitation source may be optically coupled to one or more optical fibers such that multiple excitation wavelengths may be delivered to a zone 48.

As indicated in FIG. 6 and FIG. 7, a sensing system can include a reflector 52 for communicating signals between a communications fiber 44 and a shaft access port 35. The reflection face of a reflector 52 can generally be highly reflective, e.g., reflective about 90% or more of the incident energy. In some embodiments, a highly reflective surface, such as conventionally used for optical mirrors, can be utilized. For instance, a reflective face of a reflector 52 can include a metal deposit, e.g. made by vacuum deposition, chemical vapor deposition, or any other suitable technique, of suitable metals including noble metals, such as gold, platinum or alloys, or by precipitation of silver, covered or not by a protective layer, as well as highly polished surfaces of metals, such as silver, noncorrosive steel, gold, and other noble metals.

Figure 9:
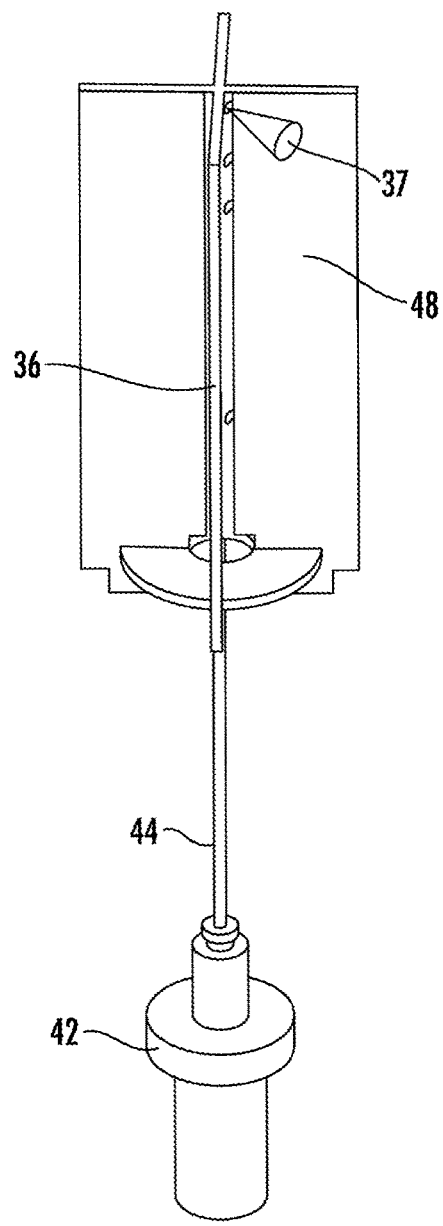
FIG. 9 provides a view of a sensing assembly in conjunction with a rotor of a centrifugal contactor disclosed herein.
Figure 10:
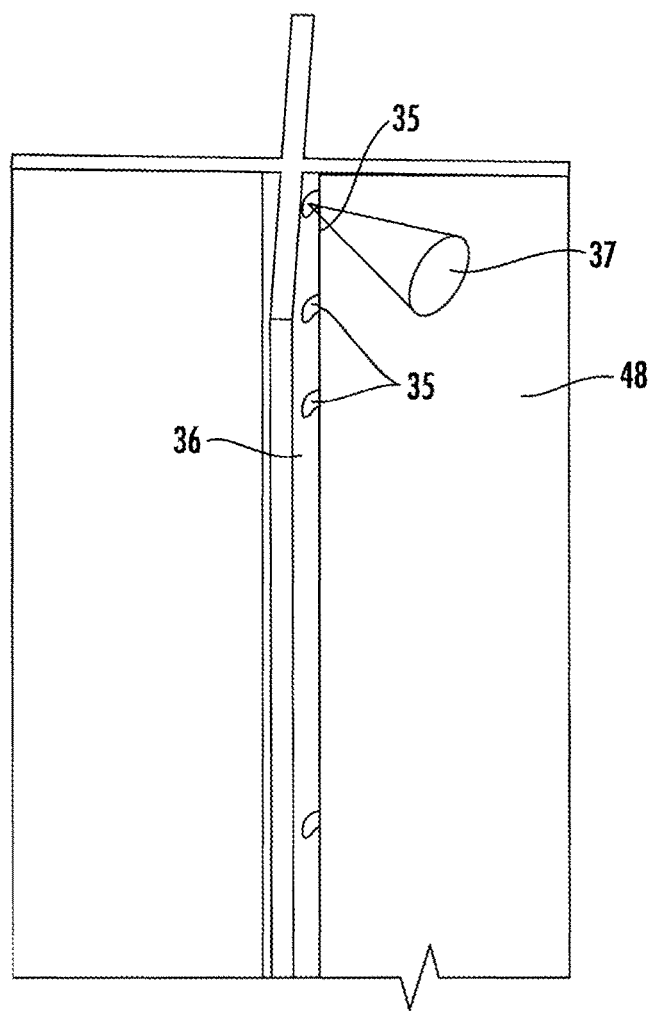
FIG. 10 provides a view of a signal communications cone as may be emitted via an access port of the shaft of a centrifugal contactor disclosed herein.

As illustrated in FIG. 9 and FIG. 10, a system can include a signal generator/receiver 42 that communicates via communications fiber 44 with a shaft access port 35 formed within a wall of a shaft 44. Upon communicating an emission signal through the communications fiber 44 retained in the hollow core of a shaft 36, an emission 37 can be delivered through an access port 35 and into a zone 48. In one embodiment, a system can include a plurality of access ports 35 along a length of the shaft 36. In such an embodiment, the end of the communication fiber 44 and an associated reflector 52 can be movable along the length of the shaft 36 so as to communicate with any access port 35 along the length. Such an embodiment can provide access to the zone 48 at multiple heights. This can be highly beneficial to a system, as the sensing system can provide information about a contact protocol throughout the height of the zone 48 of the centrifugal contactor throughout the protocol.

Though illustrated as a single signal generator/receiver 42, it will be evident to those of skill in the art that the signal generating and receiving components of a system need not be combined in a single housing and can be separate components in optical communication with a communications fiber 44. By way of example, a signal generator can include a laser, a diode, or any other suitable device that can generate and communicate a signal of the desired wavelength(s) to a communications fiber. An optical detector may correspond to a photodiode, a photoresistor, or so forth.

A signal generator/receiver 42 may include optical filters, beam splitters, and so forth that may remove background light and reduce or amplify the total input optical signal at the generator/receiver 42 to one or more relevant emission peaks. A signal received at a signal generator/receiver 42 may be examined and analyzed for emission peaks of interest according to any suitable method. For instance, a signal generator/receiver 42 may comprise a plurality of notch filters, each of which may be tuned to the spectral signature of a different material of interest. In one particular embodiment, the total input optical signal to signal generator/receiver 42 may be deconvoluted and analyzed according to a principal components analysis (PCA) regime.

For instance, a signal communicated from a zone 48 may be reduced to relevant emission peaks based on maximum variations between the input spectra. In those embodiments in which a device is designed to examine a zone 48 for a variety of components, the total response signal at the signal generator/receiver 42 may include a plurality of relevant emission peaks. Accordingly, an output signal may be generated representing one or more emission peaks of interest. In addition, information may be provided with regard to the strength of each signal, and this information may be correlated to the concentration of the detected component.

A response signal communicated to a signal generator/receiver 42 may be transmitted to signal processor for further analysis. For instance, a PCA regime may utilize information regarding a library of spectra derived from components of a reference set for a particular protocol. Data analysis techniques that may be carried out may include spectral data compression and linear regression. Using a linear combination of factors or principal components, a reconstructed spectrum may be derived. This reconstructed spectrum may then be compared with the spectra of known specimens which serve as the basis for determination of the presence or concentration of components within the zone 48.

Figure 11:
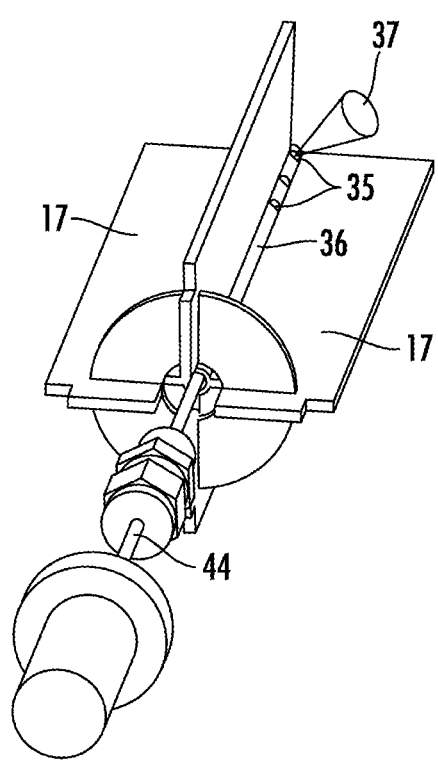
FIG. 11 provides a perspective view of a sensing assembly in conjunction with the rotor of a centrifugal contactor disclosed herein.
Figure 12:
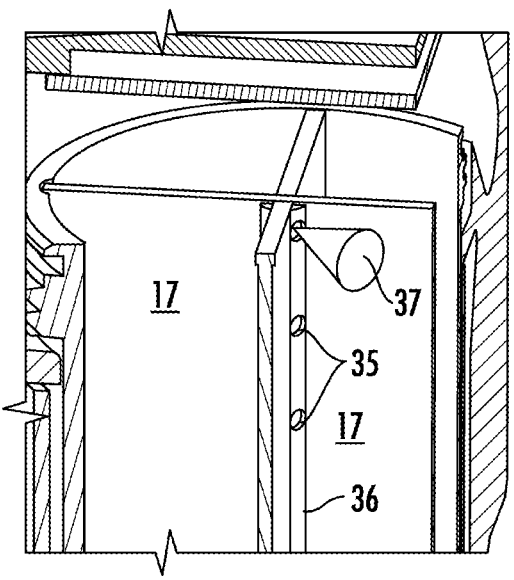
FIG. 12 provides a perspective cut-away view of a portion of a centrifugal contactor disclosed herein.
Figure 13:
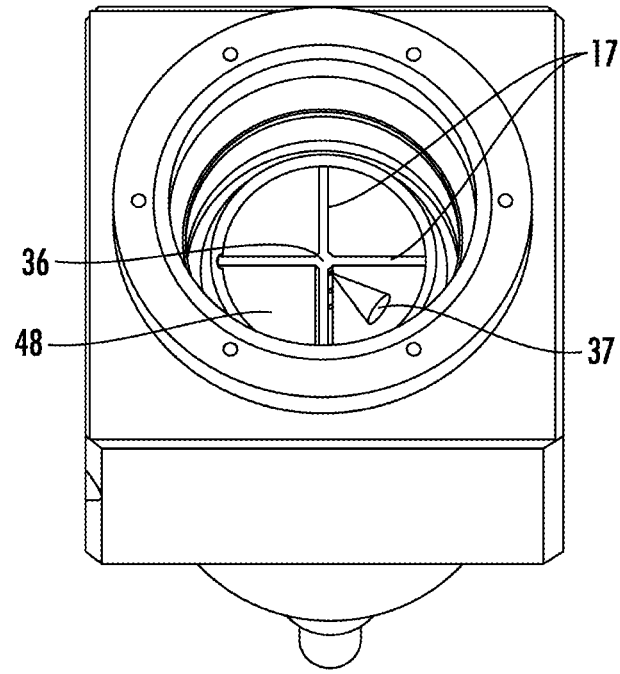
FIG. 13 provides a perspective view of a portion of a centrifugal contactor disclosed herein.

FIG. 11, FIG. 12, and FIG. 13 provide additional views of a centrifugal contactor. As illustrated in FIG. 11 and FIG. 12, in one embodiment, the rotor blades 17 can be contiguous with the shaft 36 in which case the shaft access ports 35 can be located on the shaft 36 between the rotor blades 17. As indicated, through inclusion of a plurality of shaft access ports 35 along the shaft, by sliding the end of the communications fiber 44 up and down within the shaft 36, an emissions cone can be located at any desired height within the zone 48 of a contactor.

The centrifugal contactors can be utilized to obtain on-line information in the course of any mixing/contacting protocol, including mixings in an impeller mixed tank as well as high speed centrifugal contactors. For instance, disclosed devices can be utilized in separations including organic/aqueous phase separations as well as liquid-liquid extractions.

During use, a fluid containing a mixture of materials to be separated can be introduced into a zone 48 of a device. In some embodiments, a second fluid (e.g., a solvent) can be introduced into the zone, either via the same access as the first fluid or via a second fluid. During operation, the rotor blades 17 can spin the contents rapidly around the central shaft 36, which, depending upon the nature of the materials, can mix the contents or can separate the contents according to a density gradient that develops across the span of the zone 48 in the radial direction of the shaft 36.

In one embodiment, the centrifugal contactors can be useful for performing a liquid-liquid extraction. By way of example, a liquid-liquid extraction protocol can include feeding a first liquid containing a desired constituent into a zone 48 and feeding a second liquid having a different density than the first liquid into the zone 48. The desired constituent can exhibit a greater affinity for the second liquid than the first liquid at the conditions of the extraction protocol. The two liquids can initially be combined and mixed in a mixing zone prior to directing the mixed materials into a zone 48. Upon mixing, the desired constituent can preferentially transfer to the second liquid. Within the zone 48, the rotor can be utilized to spin the mixture at high speeds, e.g., about 4000 rpm or greater, thereby developing a density gradient of the first and second liquids and the desired constituent now contained in the second liquid across a radial span of the zone. Following, the first and second liquids can be removed from the zone as a first stream and a second stream, one of which exiting via the high density outlet and the other exiting via the low density outlet, with the second stream containing at least some of the desired constituent.

The centrifugal contactors can be highly beneficial in nuclear applications such as nuclear waste reprocessing, e.g., for lanthanide and actinide extractions. Exemplary extraction methods that can benefit from use of the disclosed contactors include, without limitation, the Trivalent Actinide-Lanthanide Separation by Phosphorous Reagent Extraction from Aqueous Complexes process ("TALSPEAK"), the Actinide Lanthanide Separation process ("ALSEP"), and the Caustic Side Solvent Extraction process ("CSSX").

The present disclosure may be better understood with reference to the Examples set forth below.

Example

Figure 14:
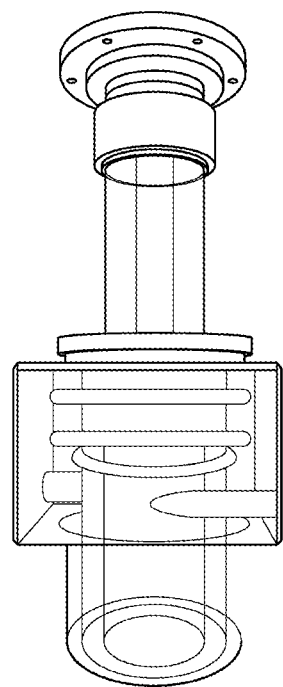
FIG. 14 provides an exploded view of a centrifugal contactor used in examples described further herein.
Figure 15:
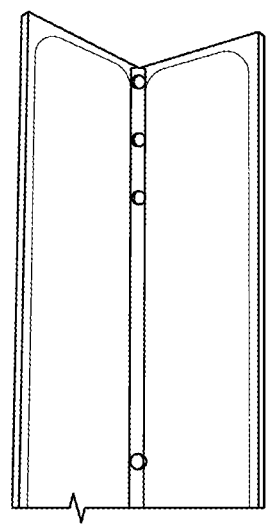
FIG. 15 illustrates the rotor of the contactor of FIG. 14 including access ports and a fiberscope head at an access port of the shaft.
Figure 16:
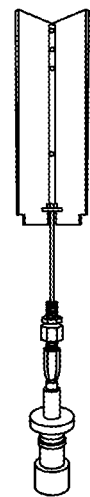
FIG. 16 illustrates the rotor of the contactor of FIG. 14 following combination with a fiberscope.

A centrifugal contactor as described was formed with a clear rotor housing as illustrated in FIG. 14. The central shaft of the rotor was hollow and access ports were formed in the wall of the central shaft (FIG. 15). The communications fiber of a fiberscope was installed in the central shaft of the rotor (FIG. 16). The head of the fiberscope, held within the shaft, could be slid up and down the shaft to allow access to each of the access ports.

The feed to the contactor included an organic liquid with water, dilute nitric acid, or dilute boric acid. The mixture was homogenized and then pumped into the separating zone of the contactor. The contactor was rotated at speeds of from about 300 rpm to about 4500 rpm and images of the droplets were obtained externally.

FIG. 17 provides an image collected from outside of the rotor housing of droplets dispersed in a carrier liquid. In FIG. 18, tracks of the particles of FIG. 17 are shown, and the orientation plot of these particles is provided in FIG. 19.

Figure 20:
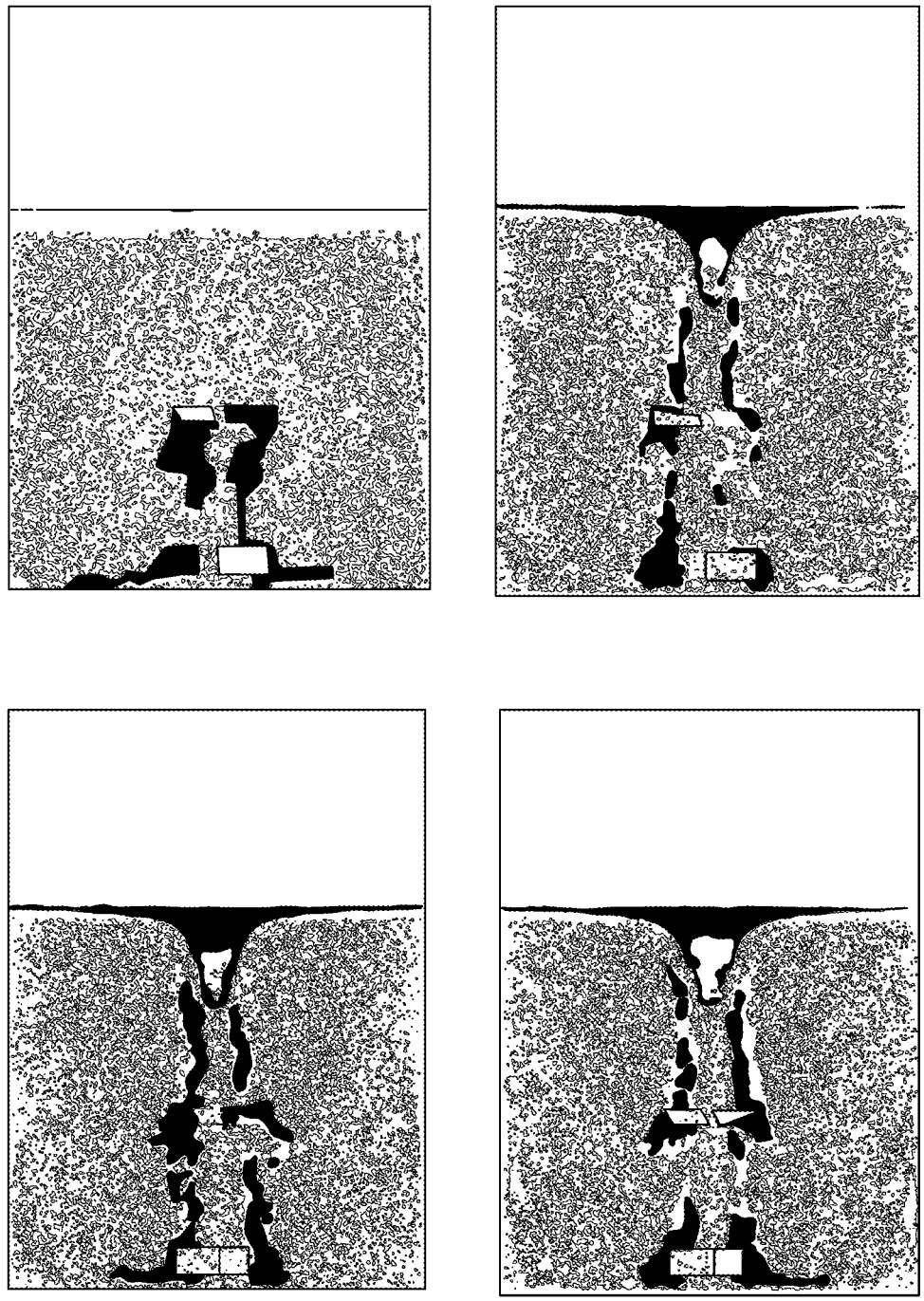
FIG. 20 provides several images obtained by use of a system as disclosed showing the movement of hydrogen bubbles in an impeller mixed tank.

FIG. 20 provides images obtained by tracking hydrogen bubbles in a mixing tank that included an impeller and a fiberscope inserted into the impeller shaft. The images were obtained from outside of the housing.

While certain embodiments of the disclosed subject matter have been described using specific terms, such description is for illustrative purposes only, and it is to be understood that changes and variations may be made without departing from the spirit or scope of the subject matter.

What is claimed is:

1. A method for separating a first material from a second materials comprising:
    feeding a first material to a separating zone of a centrifugal contactor;
    feeding a second material to the separating zone of the centrifugal contactor;
    spinning the first and second materials about a shaft within the centrifugal contactor by use of a plurality of rotor blades that revolve about an axis of the shaft, wherein upon the spinning, the first and second materials separate within the separating zone according to a density gradient across a span in a radial direction, the radial direction being defined by a radius of the shaft;
    during the spinning, transmitting a signal from the separating zone to a first end of a communications fiber retained within a hollow core of the shaft; and
    analyzing the signal to obtain information about the separation.

2. The method of claim 1, further comprising transmitting an emission signal from the first end of the communications fiber to the separating zone.

3. The method of claim 1, wherein the signal comprises an optical signal.

4. The method of claim 1, wherein the signal comprises an acoustic signal.

5. The method of claim 1, wherein the method comprises a liquid-liquid extraction.

6. The method of claim 1, wherein the method comprises a phase separation.

7. A method for combining a first material with a second materials comprising:
    feeding a first material to a mixing tank of an impeller mixed tank;
    feeding a second material to the mixing tank of the impeller mixed tank;
    spinning the first and second materials about a shaft within the impeller mixed tank by use of a plurality of rotor blades that revolve about an axis of the shaft, wherein upon the spinning, the first and second materials mix within the mixing tank;
    during the spinning, transmitting a signal from the mixing tank to a first end of a communications fiber retained within a hollow core of the shaft; and
    analyzing the signal to obtain information about the mixing.

8. The method of claim 7, further comprising transmitting an emission signal from the first end of the communications fiber to the mixing tank.

9. The method of claim 7, wherein the signal comprises an optical signal.

10. The method of claim 7, wherein the signal comprises an acoustic signal.

* * * * *